United States Patent

[11] 3,578,849

[72] Inventor Hubert Guillet
Saint Germain-les-Arpajon, France
[21] Appl. No. 840,813
[22] Filed July 10, 1969
[45] Patented May 18, 1971
[73] Assignee Commissariat A L'Energie Atomique
Paris, France
[32] Priority July 23, 1968
[33] France
[31] 160311

[54] DIAPHRAGM FOR A LASER AMPLIFIER CHAIN
1 Claim, 2 Drawing Figs.
[52] U.S. Cl.................................................. 350/321,
330/4.3, 331/94.5, 350/205
[51] Int. Cl................................................ G02b 27/00
[50] Field of Search........................................... 350/205,
204, 206, 321; 331/94.5; 330/4.3

[56] References Cited
UNITED STATES PATENTS
3,286,193 11/1966 Koester et al................ (350/205UX)
3,421,097 1/1969 Koester et al................ 331/94.5X
3,426,293 2/1969 Snitzer......................... 331/94.5

Primary Examiner—John K. Corbin
Attorney—Cameron, Kerkam & Sutton

ABSTRACT: A diaphragm for a laser amplifier chain, comprising an element operable as a transparent divergent lens to an incident laser beam and including an aperture disposed centrally of the lens and of a size to permit a substantially part of a laser beam to pass from a driver laser to a laser amplifier. The element has a planar face on the side of the driver laser and a concave recess surrounding the aperture on its other side.

PATENTED MAY 18 1971 3,578,849

DIAPHRAGM FOR A LASER AMPLIFIER CHAIN

The present invention concerns a diaphragm for a laser amplifier chain.

It is an aim of the invention to provide an improved diaphragm which will reduce or eliminate the detrimental effects of backward waves set up in previously known laser chains.

According to the invention, there is provided a diaphragm for a laser amplifier chain, comprising an element effective as a transparent divergent lens to an incident laser beam and including an aperture disposed substantially centrally of the lens and of a size to permit a substantial part of a laser beam to pass from a driver laser to a laser amplifier.

According to a feature of the invention, the element on the side of the driver laser is planar and wherein the fact of the element on the side of the laser amplifier includes a concave recess surrounding the aperture.

Figure 1:
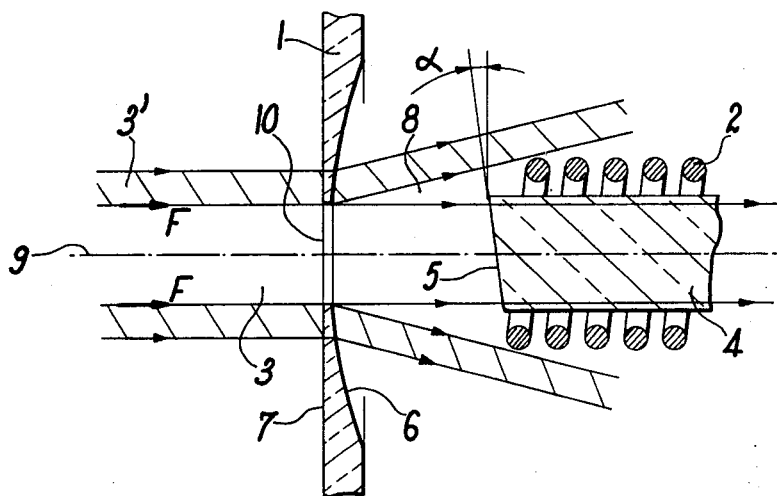
Figure 2:
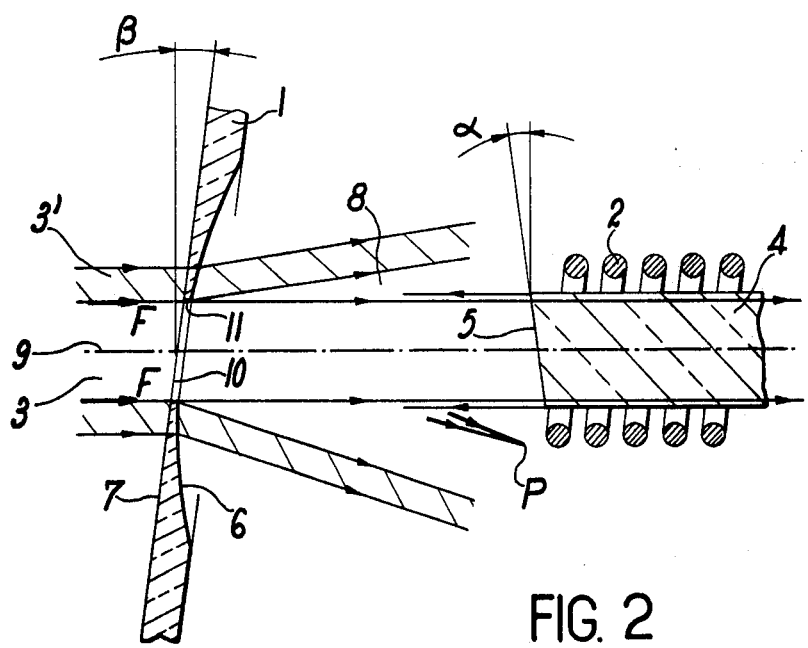

Features and advantages of the invention will be apparent from the following description of embodiments thereof given by way of example only in conjunction with the accompanying drawings, wherein:

FIG. 1 illustrates in longitudinal axial section a diaphragm according to the invention disposed in front of a laser amplifier rod, and in which the planar face of the diaphragm is perpendicular to the axis of the rod and, FIG. 2 is a view similar to that of FIG. 1, but in which the planar face of the diaphragm is inclined to the axis of the rod.

Referring to FIG. 1, the diaphragm takes the form of a plate 1 of transparent glass whereof a face 7 which receives an incident beam 3 emitted by a preceding laser rod (not illustrated) is planar, and whereof the other face is hollowed out in the manner of a concave part-spherical recess 6.

The diaphragm is pierced by a central aperture 10 which is approximately equal in diameter to a rod 4 of a laser amplifier 2 excited by the beam 3.

The generatrices 11 of the central aperture 10 are perpendicular to the plane face 7.

The arrangement is such that the the axis 9 of the incident beam (arrows F) coincides with the longitudinal axis of the rod 4, and that the plane face 7 of the diaphragm is perpendicular to this axis, the center of the circular aperture 10 lying on this axis.

An input face 5 of the rod 4 is in the present case cut obliquely with respect to the longitudinal axis of the rod; the inclination $\alpha$ of this input face 5, which is about 6°, has the purpose of preventing the rays reflected by the face 5 from striking the laser rod situated upstream of the rod 5 (assuming that it is sufficiently far from the latter) and setting up a backward wave which would limit the amplification.

Because of the concave recess 6, the diaphragm 1 imparts divergence to the outside incident rays which form a cylindrical ring 3', this divergence preventing them from reaching the input face 5 of the rod 4, the rays emerging from the recess 6 leave a dead space 8.

The diaphragm just described deflects a large part of the parasitic reflected rays emanating from the rod 4 which thus do not reach the input face of the previous laser rod, and which are not absorbed and therefore do not damage the diaphragm. However, if the diaphragm is of the type illustrated in FIG. 1, there is nevertheless the risk of a detrimental effect occurring if the rays of the beam 3 which are reflected on the input face 5 of the rod 4 or diffused back become focused on the input face 5 and damage it after having been reflected a second time at the concave recess 6 of the diaphragm.

The variant of embodiment of the diaphragm according to the invention as illustrated in FIG. 2 enables this disadvantage to be avoided.

In the case of FIG. 2, in which elements corresponding to those in FIG. 1 bear the same reference numbers as in the latter, the diaphragm 1 is inclined with respect to the axis; its plane face 7 is at an angle $\beta$ of about 10° to the plane perpendicular to the axis.

This inclination imparts an ellipticity of the order of 0.95 to the effective size of the aperture 10 of diaphragm 1, but the effect of this is negligible in practice.

The arrangement may likewise be embodied in such a manner that the generatrices 11 are orientated in the direction of the axis 9 of the incident laser beam 3. Finally, the orifice may be elliptical, so that a cylindrical surface bearing against the edge of the orifice and parallel to the axis of the orifice will be a cylinder of revolution about this axis.

Such a diaphragm orientated in this manner with respect to the axis 9 of the laser beam 3 causes the rays of the beam successively reflected on the input face 5 of the rod 4 and on the concave recess 6 of the diaphragm to become focused at a point P situated outside the input face 5 of the rod, the face 5 being inclined for example at 6°.

In order to obtain complete protection, it is preferable to dispose a diaphragm according to the invention in front of each laser amplifier.

Instead of being part-spherical, the concave recess 6 of the diaphragm 1 may be part-conical, and the glass used may be an attenuating glass which absorbs part of the light-rays passing through it.

I claim:

1. A laser amplifier chain comprising a driver laser having a rod emitting a cylindrical beam, a laser amplifier with a rod receiving said beam through an input base thereof, said laser amplifier rod having its longitudinal axis coincident with the axis of said beam, said input face being oblique with respect to said longitudinal axis, a transparent divergent lens mounted between said driving laser and said laser amplifier transversely to said beam, said lens having planar face towards said driver laser and oblique with respect to said longitudinal axis and a concave face toward said laser amplifier, said lens having an aperture centered on said longitudinal axis, said aperture being substantially identical to the cross section of the rod of said laser amplifier through a plane at right angles to said longitudinal axis.